US010915603B2

(12) United States Patent
Noh et al.

(10) Patent No.: US 10,915,603 B2
(45) Date of Patent: Feb. 9, 2021

(54) METHOD FOR ESTIMATING SUITABILITY AS MULTI-SCREEN PROJECTING TYPE THEATRE SYSTEM

(71) Applicant: KOREA ADVANCED INSTITUTE OF SCIENCE AND TECHNOLOGY, Daejeon (KR)

(72) Inventors: Junyong Noh, Daejeon (KR); Jungjin Lee, Daejeon (KR); Sangwoo Lee, Daejeon (KR); Younghui Kim, Daejeon (KR); Bumki Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 447 days.

(21) Appl. No.: 15/832,954

(22) Filed: Dec. 6, 2017

(65) Prior Publication Data
US 2018/0165252 A1     Jun. 14, 2018

(30) Foreign Application Priority Data

Dec. 9, 2016   (KR) .................. 10-2016-0167645
Nov. 22, 2017  (KR) .................. 10-2017-0156207

(51) Int. Cl.
G06F 17/18    (2006.01)
G06T 17/20    (2006.01)
H04N 9/31     (2006.01)
E04H 3/22     (2006.01)
G06F 30/13    (2020.01)
(Continued)

(52) U.S. Cl.
CPC .............. *G06F 17/18* (2013.01); *G06T 17/20* (2013.01); *H04N 9/3147* (2013.01); *H04N 9/3185* (2013.01); *E04H 3/22* (2013.01); *G03B 21/56* (2013.01); *G06F 30/13* (2020.01); *G06F 2111/10* (2020.01)

(58) Field of Classification Search
None
See application file for complete search history.

(56) References Cited

U.S. PATENT DOCUMENTS 9,141,655 B2 *   9/2015   Sengupta ................ G06F 16/22
10,691,010 B2 *  6/2020   Maes .................... G03B 21/602
(Continued)

FOREIGN PATENT DOCUMENTS

KR   10-2015-0048568    5/2015

*Primary Examiner* — Kibrom K Gebresilassie (57) ABSTRACT

The present disclosure relates to a method and a device for estimating suitability as a multi-screen projecting type theatre and the method for estimating the suitability as the multi-screen projecting type theatre includes: creating a plurality of image representation models (M) respectively corresponding to a plurality of candidate theatres; calculating a total image representation model ($\hat{M}_{total}$) corresponding to all of the plurality of candidate theatres; and calculating a deviation between the total image representation model ($\hat{M}_{total}$) and each of the plurality of image representation models (M) of the target theatre and estimating theatre suitability of the target theatre based on the deviation when one target theatre is selected among the plurality of candidate theatres.

4 Claims, 5 Drawing Sheets

(51) Int. Cl.
*G06F 111/10* (2020.01)
*G03B 21/56* (2006.01)

(56) References Cited

U.S. PATENT DOCUMENTS

| | | | | |
|---|---|---|---|---|
| 2002/0010640 | A1* | 1/2002 | Dutta | G06Q 20/10 |
| | | | | 705/5 |
| 2004/0136490 | A1* | 7/2004 | Edic | A61B 6/032 |
| | | | | 378/4 |
| 2005/0113680 | A1* | 5/2005 | Ikeda | A61B 6/481 |
| | | | | 600/425 |
| 2006/0210019 | A1* | 9/2006 | Rasche | A61B 6/5264 |
| | | | | 378/62 |
| 2007/0097334 | A1* | 5/2007 | Damera-Venkata | |
| | | | | H04N 9/3147 |
| | | | | 353/94 |
| 2007/0133794 | A1* | 6/2007 | Cloutier | G03B 21/13 |
| | | | | 380/200 |
| 2012/0250480 | A1* | 10/2012 | Kurokawa | G11B 7/00456 |
| | | | | 369/47.28 |
| 2015/0063534 | A1* | 3/2015 | Allmendinger | A61B 6/032 |
| | | | | 378/19 |
| 2015/0113404 | A1* | 4/2015 | Agnoli | G06F 3/0484 |
| | | | | 715/719 |
| 2016/0127723 | A1* | 5/2016 | Kim | H04N 9/3147 |
| | | | | 348/47 |
| 2016/0178361 | A1* | 6/2016 | Kang | G03B 37/04 |
| | | | | 702/158 |
| 2016/0189064 | A1* | 6/2016 | Mao | G06Q 10/02 |
| | | | | 705/5 |
| 2016/0283586 | A1* | 9/2016 | Thapliyal | G06Q 10/10 |
| 2017/0127030 | A1* | 5/2017 | Chida | G06T 11/60 |
| 2017/0289509 | A1* | 10/2017 | Weisgerber | E04H 3/22 |
| 2019/0105568 | A1* | 4/2019 | Platt | A63F 13/216 |
| 2020/0162819 | A1* | 5/2020 | Inoue | H04R 3/12 |

* cited by examiner

METHOD FOR ESTIMATING SUITABILITY AS MULTI-SCREEN PROJECTING TYPE THEATRE SYSTEM

CROSS-REFERENCE TO RELATED APPLICATION

This application claims priority of Korean Patent Application No. 10-2016-0167645, filed on Dec. 9, 2016, and priority of Korean Patent Application No. 10-2017-0156207, filed on Nov. 22, 2017, in the KIPO (Korean Intellectual Property Office), the disclosure of which is incorporated herein entirely by reference.

BACKGROUND OF THE INVENTION

Field of the Invention

The present disclosure relates to a method for estimating suitability as a multi-screen projecting type theatre in order to estimate whether a general theatre can be used as a multi-screen projecting type theatre.

Description of the Related Art

For the past few years, computer graphic researchers have been making effort to develop a technology for giving a greater visual immersive feeling to people.

As an example of this effort, there is proposed a multi-screen projecting type theatre which additionally provides two side screens other than a front screen and projects auxiliary contents to both side screens while projecting main contents to the front screen using a multi-projection technology.

Here, when the multiple screens having a three-dimensional structure are used, a side screen viewing angle relatively largely changes according to a position of a viewer and thus a problem arises in that an image on the side screen is distorted.

Then, there is a possibility that most of the contents for the side screen may not be visible depending on the position of the viewer. In this case, it is desirable to exclude the theatre in which the problem of the distorted image is severe from the multi-screen projecting type theatre.

Korean Patent Application Publication No. 10-2015-0048568, published on May 7, 2015, is relevant to the subject matter of the present invention.

SUMMARY OF THE INVENTION

An object of the present disclosure is to provide a method for estimating suitability as a multi-screen projecting type theatre in order to estimate whether a general theatre can be used as a multi-screen projecting type theatre.

In order to achieve the object of the present disclosure, according to an aspect of the present disclosure, there is provided a method for estimating suitability as a multi-screen projecting type theatre, including: creating a plurality of image representation models (M) respectively corresponding to a plurality of candidate theatres; calculating a total image representation model ($\hat{M}_{total}$) corresponding to all of the plurality of candidate theatres; and calculating a deviation between the total image representation model ($\hat{M}_{total}$) and each of the plurality of image representation models (M) of the target theatre and estimating theatre suitability of the target theatre based on the deviation when one target theatre is selected among the plurality of candidate theatres.

The step of calculating the theatre suitability of the target theatre may include: calculating a deviation ($E_A$) between the total image representation model ($\hat{M}_{total}$) and the seat distribution of the target theatre A according to the formula of $$E_A = \frac{1}{k} \cdot \sum_k \sum_i w_{i,k}\left(\hat{\delta}_i^{total} - \delta_i(o_k^A)\right)^2;$$

and determining that the theatre is not suitable when the deviation ($E_A$) is equal to or larger than a predetermined reference value and determining that the theatre is suitable otherwise. Here, $o_k^A$ indicates a k-th seat of the target theatre A, $\hat{\delta}_i^{total}$ indicates an i-th local shape of the total image representation model ($\hat{M}_{total}$), and $w_{i,k}$ indicates a weighted value.

The step of creating the image representation model (M) may include: creating a grid mesh corresponding to each seat by vertically and horizontally sampling a screwing viewing angle at each seat of the candidate theatre; recognizing local shapes of all vertexes in the grid meshes respectively corresponding to the seats and seeking a final local shape for minimizing a sum of a difference between the local shapes; acquiring a vertex set corresponding to the final local shape and creating a final grid mesh including the vertex set; and setting the final grid mesh by the image representation model (M) of the candidate theatre.

In the step of seeking the final local shape, the local shapes of all vertexes in the grid meshes respectively corresponding to the seats may be recognized by using Laplacian coordinates or similarity transformation.

In order to achieve the object of the present disclosure, according to another aspect of the present disclosure, there is provided a device for estimating suitability as a multi-screen projecting type theatre, including: an image representation model creating unit which creates a plurality of image representation models (M) respectively corresponding to a plurality of candidate theatres; a total image representation model creating unit which calculates a total image representation model ($\hat{M}_{total}$) corresponding to all of the plurality of candidate theatres; and a suitability estimating unit which calculates a deviation between each of the plurality of image representation models (M) and the total image representation model ($\hat{M}_{total}$) and estimates theatre suitability of each of the plurality of candidate theatres based on the deviation.

Since the present disclosure provides an objective reference for estimating whether a general theatre can be used as a multi-screen projecting type theatre, there is no need to actually install a system. Thus, unnecessary cost and waste of time can be minimized.

BRIEF DESCRIPTION OF THE DRAWINGS

The above and other features and advantages will become more apparent to those of ordinary skill in the art by describing in detail exemplary embodiments with reference to the attached drawings, in which.

In the following description, the same or similar elements are labeled with the same or similar reference numbers.

DETAILED DESCRIPTION

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, a term such as a "unit", a "module", a "block" or like, when used in the specification, represents a unit that processes at least one function or operation, and the unit or the like may be implemented by hardware or software or a combination of hardware and software.

Reference herein to a layer formed "on" a substrate or other layer refers to a layer formed directly on top of the substrate or other layer or to an intermediate layer or intermediate layers formed on the substrate or other layer. It will also be understood by those skilled in the art that structures or shapes that are "adjacent" to other structures or shapes may have portions that overlap or are disposed below the adjacent features.

In this specification, the relative terms, such as "below", "above", "upper", "lower", "horizontal", and "vertical", may be used to describe the relationship of one component, layer, or region to another component, layer, or region, as shown in the accompanying drawings. It is to be understood that these terms are intended to encompass not only the directions indicated in the figures, but also the other directions of the elements.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

Figure 1:
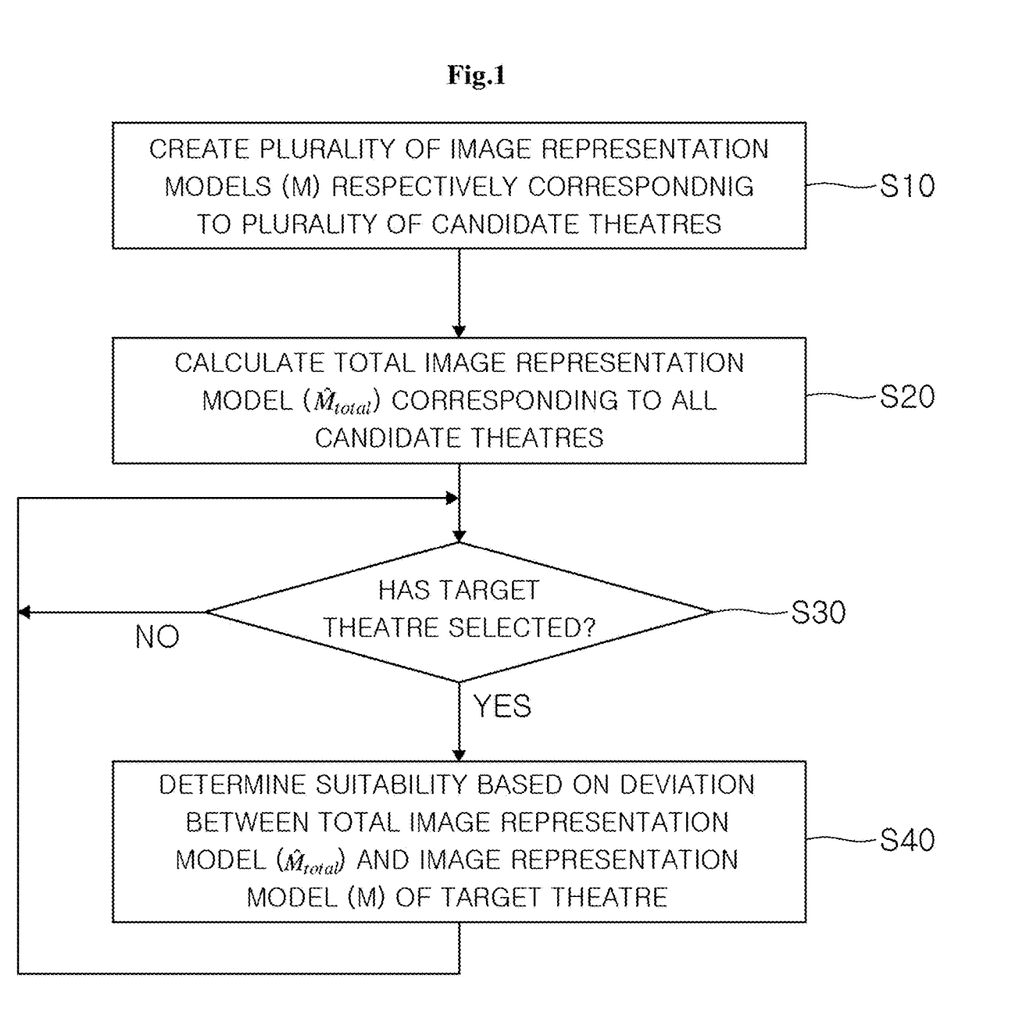
FIG. 1 is a schematic operation flowchart of a method for estimating suitability as a multi-screen projecting type theatre according to an exemplary embodiment of the present disclosure.

FIG. 1 is a schematic operation flowchart of a method for estimating suitability as a multi-screen projecting type theatre according to an exemplary embodiment of the present disclosure.

Referring to FIG. 1, the method of the present disclosure may include a step (S10) of creating a plurality of image representation models (M) respectively corresponding to a plurality of candidate theatres, a step (S20) of calculating a total image representation model ($M_{total}$) corresponding to the plurality of candidate theatres, a step (S30) of selecting one target theatre among the plurality of candidate theatres, and a step (S40) of calculating a deviation between the image representation model (M) of the target theatre and the total image representation model ($\hat{M}_{total}$) and estimating theatre suitability of the target theatre based on the deviation, and the like.

Hereinafter, the method of the present disclosure will be described in more detail with reference to FIGS. 2 to 6.

The image representation model (M) of the present disclosure quantifies the movie viewing experience in each seat in the theatre as a mathematical model.

Figure 2:
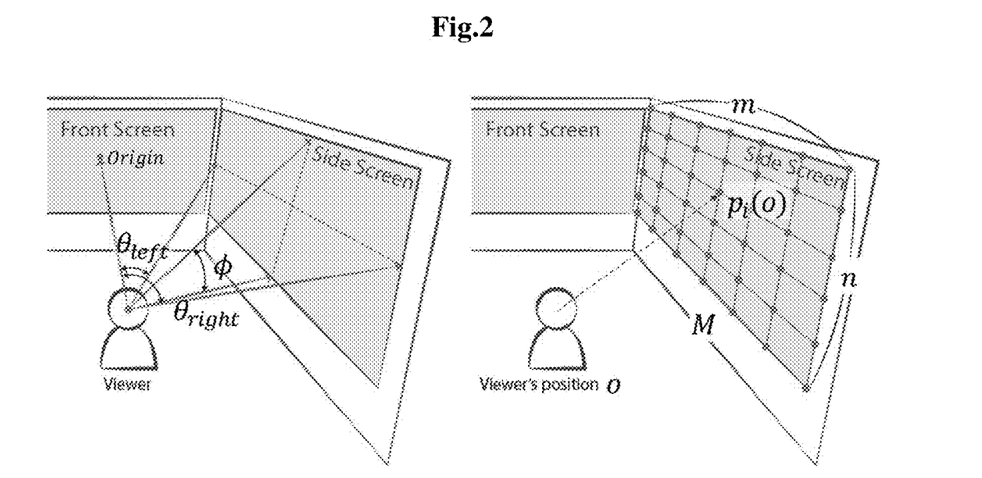
FIGS. 2 to 6 are diagrams more specifically illustrating an image representation model creating step according to an exemplary embodiment of the present disclosure.

For this configuration, a viewing direction from a seat (i.e., a viewer position) to the side screen is sampled vertically and horizontally at a uniform angle. As shown in FIG. 2(a), each sampling point can be expressed in a two-dimensional polar coordinate space $S \subset (\theta, \varphi)$, $\theta$ and $\varphi$ respectively represent vertical and horizontal coordinates of each sampling point, and an origin of S is located at a center point of the front screen.

A range of a horizontal angle covering the side screen can be defined by Math. 1 and a vertical angle with respect to each horizontal angle can be defined by Math. 2.

$$\theta_{left} \leq \theta_u \leq \delta_{right} \qquad \text{[Math. 1]}$$

At this time, $\theta_{left}$ and $\theta_{right}$ respectively indicate horizontal angles in which the side screen can be expanded in the left and right directions.

$$\varphi_{u,top} \leq \varphi_v \leq \varphi_{u,bottom} \qquad \text{[Math. 2]}$$

At this time, $\varphi_{u,top}$ and $\varphi_{u,bottom}$ respectively correspond to vertical angles of upper and lower boundary faces of the side screen with respect to the horizontal angle $\theta_u$.

Referring to Maths. 1 and 2, it is understood that the range of the vertical angle can be changed in accordance with a distance between the seat and the side screen. When the vertical angle range $\varphi_v$ for each horizontal angle is uniformly sampled at the vertical angle n (n is a natural number of 2 or more) and the horizontal angle range $\varphi_u$ is uniformly sampled at the horizontal angle m (m is a natural number of 2 or more), a grid mesh M which is defined in an image space ($I \subset (u,v)$) overlaid on the side screen can be acquired as shown in FIG. 2(b). For reference, m and n are values which can be adjusted in consideration of various variables (a system environment and a user request).

Since the position of the i-th vertex $p_i \in (u,v)$ of the grid mesh M in the image space I is changeable according to the three-dimensional position o of the viewer, the image coordinate $p_i(o)$ of the grid mesh M at the side screen can be also changed. This means that $p_i(o)$ created at the position o appears in a distorted state at a different position o' and this is because image representation models respectively corresponding seat positions (or viewing points) are different from each other.

Figure 3:
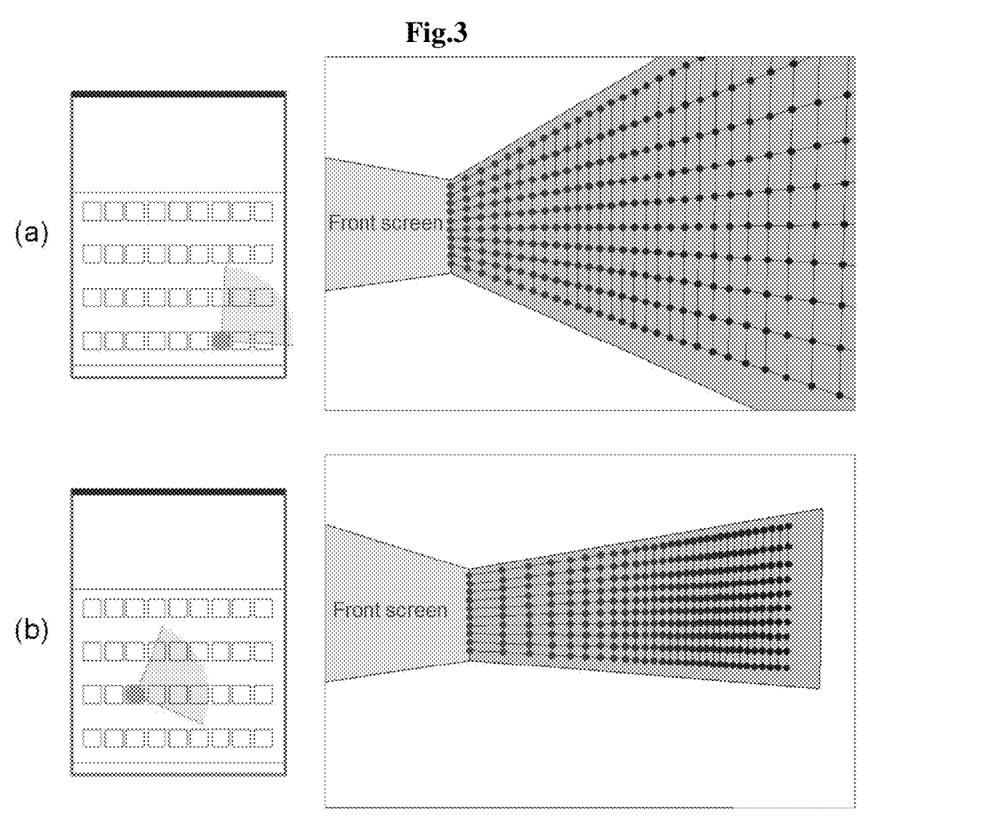
Figure 4:
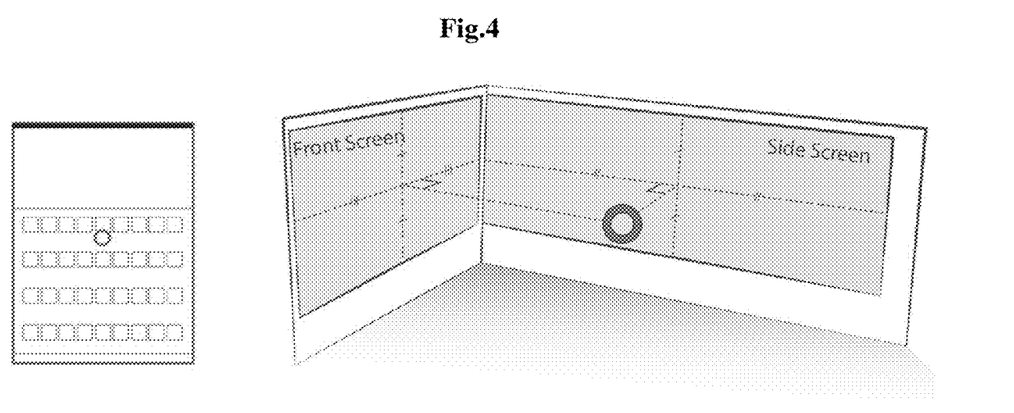
Figure 5:
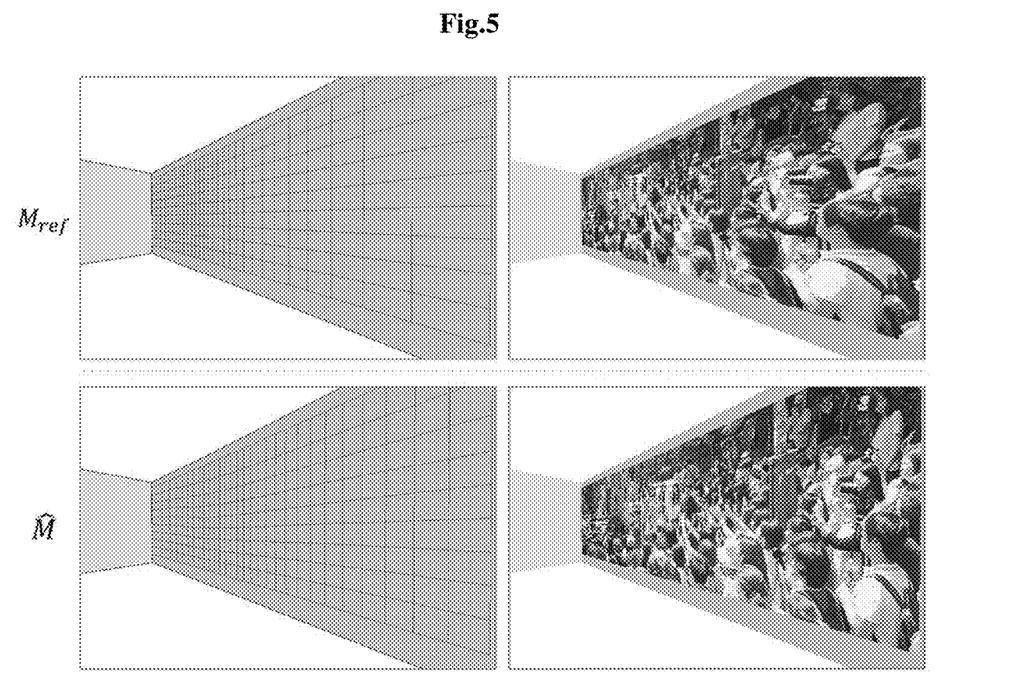

FIG. 3 shows a grid mesh which changes according to the seat position. Referring to this drawing, it is understood that the grid mesh M corresponding to a seat position a is distorted in a different seat position, for example, a seat position b.

Then, a reference grid mesh $M_{ref}$ corresponding to a reference viewing point of an image (i.e., a target image) to be projected onto the side screen is created.

The reference viewing point is a position of an actual camera that creates a side image and has a feature that information at that position is not easily acquired at a photographing position, but is easily acquired by CG (Computer Graphics) contents. Here, if the reference viewing point information cannot be acquired by CG contents, the present disclosure is contrived to acquire the reference viewing point information by resizing the image. That is, the three-dimensional position value of the reference viewing point can be easily recognized by resizing the image to be projected onto the side screen through an image correction step shown in FIG. 4 to match the height of the front screen, acquiring x and y coordinates of the reference viewing point based on the center point of the resized image, and additionally acquiring the z coordinate of the reference viewing point based on the center point of the front screen width.

In a geometry processing field, the local shape of the vertex inside the grid mesh is generally expressed through the Laplacian coordinate. Thus, the present disclosure is contrived to measure the distortion of $p_i(o)$ by using the Laplacian coordinate. That is, the local shape of each vertex $p_i$ inside the grid mesh is expressed through the Laplacian coordinate $\delta i$ as in Math. 3. Then, the final local shape is recognized by forming an objective function for minimizing a change in the Laplacian coordinate $\delta i$ of Math. 3 as in Math. 4 and obtaining a solution of the minimizing problem of the objective function. That is, the local shape corresponding to the final grid mesh for minimizing the shape distortion is recognized by acquiring $\hat{\delta}_i$ for minimizing a difference between the values acquired through Math. 3.

$$\delta_i(o) = p_i(o) - \frac{1}{n_j}\sum_{j \in N_i} p_j(o) \qquad [\text{Math. 3}]$$

At this time, $N_i$ indicates the set of the neighboring vertexes of $p_i$ and $n_j$ indicates the cardinality of that is, the number of the neighboring vertexes.

$$\underset{\hat{\delta}_i}{\text{argmin}}\sum_k\sum_i w_{i,k}\left(\hat{\delta}_i - \delta_i(o_k)\right)^2 \qquad [\text{Math. 4}]$$

At this time, $\hat{\delta}_i$ indicates the final local shape of the i-th vertex, $\delta_i(o_k)$ indicates the local shape of the i-th vertex in the grid mesh corresponding to the k-th seat, k indicates the seat index, i indicates the index of the vertex in the grid mesh, and $w_{i,k}$ indicates the weighted value according to the user position.

Here, in the present disclosure, Math. 4 is performed under the boundary and line constraints according to Math. 5 in order to ensure continuity between the side screen image and the front screen image.

$$\begin{cases} p_u^* = u^* \\ p_v^* = v^* \end{cases} \qquad [\text{Math. 5}]$$

$$\text{and } \hat{p}^l = c^l$$

At this time, $\hat{p}$ indicates the vertex set of the grid mesh, $\hat{p}^*$ indicates the set of the boundary vertexes of $\hat{P}$ when $\hat{p}$ satisfies $\hat{\delta}_i$, $u^*$ and $v^*$ indicate boundary values of the horizontal axis (u) and the vertical axis (v) in a video projection space, $\hat{p}^l$ and $c^l$ indicate v values of the vertexes of M and $M_{ref}$, and these are connected to the front screen.

The weighted value $w_{i,k}$ indicates a value which reflects the attention of the viewer and is defined by Math. 6.

$$w_{i,k} = e^{-\frac{(\frac{\theta}{\pi})^2}{\sigma^2}} \qquad [\text{Math. 6}]$$

The falloff reflects the assumption that the viewers tend to focus on the front screen and the possibility of seeing the side screen as it goes away from the front screen increases and in the present disclosure, $w_{i,k}$ has a value which decreases in inverse proportion to the angle with respect to the vertex i based on the front screen at the k-th seat position. In Math. 6, $\theta$ may have a value of 0 to $\pi$, $\theta=0$ indicates that the viewer sees the center of the front screen, and $\theta=\pi$ indicates that the viewer sees the rear side of the theatre. The variance $\sigma$ indicates the viewing angle of the viewer and is desirably set to 0.5, but may be arbitrarily adjusted according to various parameters.

In this way, the final grid mesh $\hat{M}$ having a minimum distortion in the local shape at the time of observing all viewing points can be calculated by using $\hat{\delta}$ and $\hat{p}$. $\hat{p}$ indicates the position of the vertex with respect to the corresponding $\hat{\delta}$ and can be formulated into Math. 7 as Poisson's formula.

$$\Delta\hat{p}=\hat{\delta} \qquad [\text{Math. 7}]$$

$\hat{p}$ which is an unknown variable, that is, the vertex set of the final grid mesh $\hat{M}$ can be obtained by applying a single linear system solver. Then, an image material which is best suitable for the side screen can be obtained by transforming the reference grid mesh $M_{ref}$ into the final grid mesh $\hat{M}$ as in FIG. 5.

Figure 6:
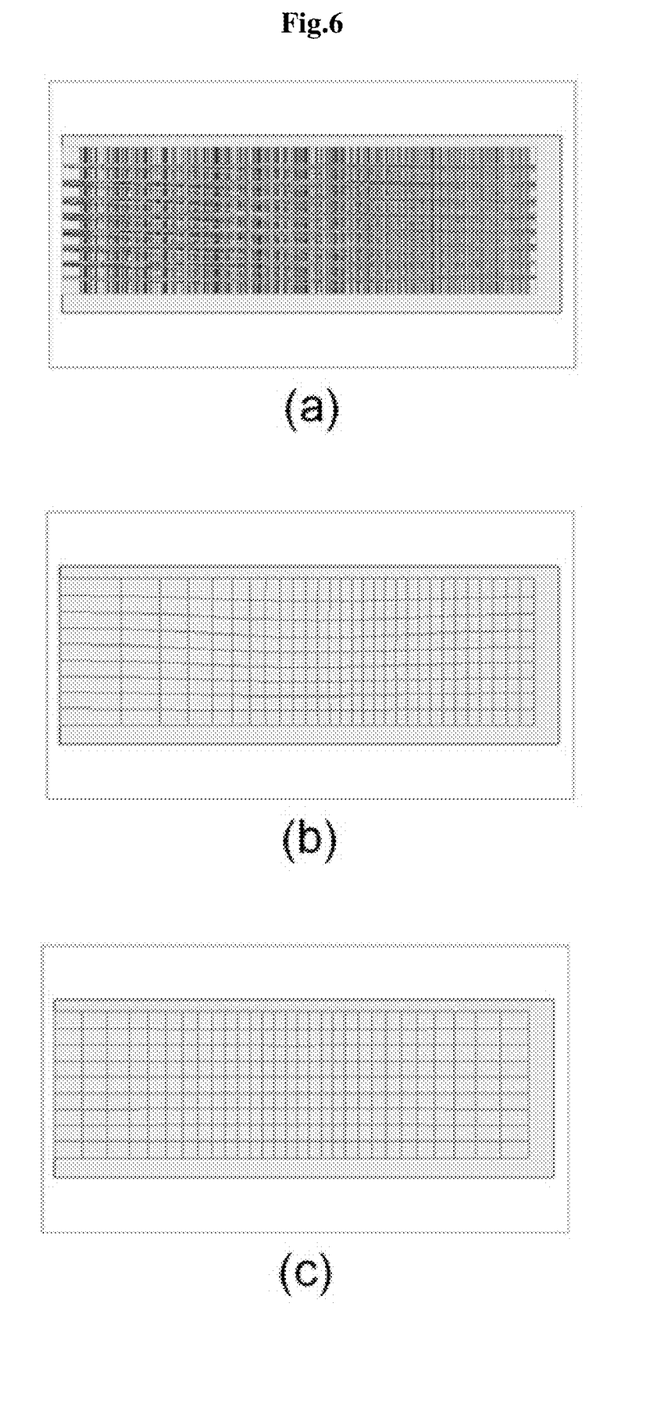

FIG. 6(a) shows all grid meshes corresponding to all seat positions of the theatre, FIG. 6(b) shows the final grid mesh $\hat{M}$, and FIG. 6(c) shows the reference grid mesh $M_{ref}$.

In the present disclosure, such a final grid mesh $\hat{M}$ is set by the image representation model (M) and is used to estimate the suitability as the theatre to be described later.

The visual experience may change due to the peripheral display observed by various sizes and configurations of different theatres. Accordingly, the present disclosure is contrived to create a plurality of image representation models (M) respectively corresponding to all candidate theatres and to estimate the suitability of the theatre with respect to a system including a front screen and a side screen as in a screen X system based on these models.

Figure 7:
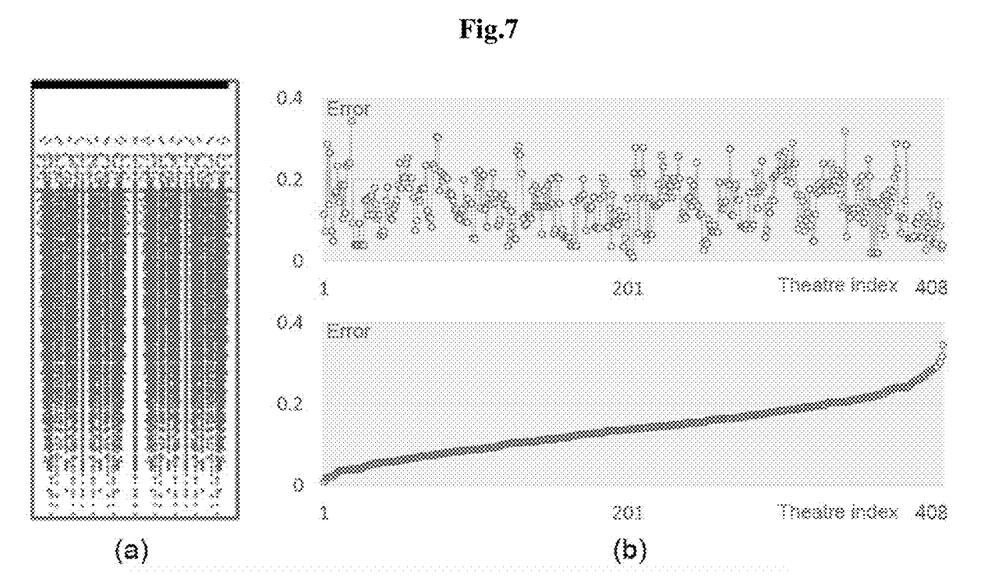
FIG. 7 is a diagram more specifically illustrating a theatre suitability estimation step according to an exemplary embodiment of the present disclosure.

FIG. 7(a) shows a result of normalizing all set positions with respect to the width of the front screen from all candidate theatres.

The present disclosure is contrived to create the image representation model $\hat{M}_{total}$ suitable for all seats of all candidate theatres as in FIG. 7(a) by applying the above-described image representation model method in the same way. That is, the total image representation model ($\hat{M}_{total}$) is calculated by collecting and statistically calculating a plurality of image representation models (M).

Then, the suitability can be estimated by comparing $\hat{M}_{total}$ with M of each theatre. $E_A$ indicates the error or degree of the unsuitability for the estimation target theatre A.

$$E_A = \frac{1}{k} \cdot \sum_k \sum_i w_{i,k} \left( \hat{\delta}_i^{total} - \delta_i(o_k^A) \right)^2 \quad \text{[Math. 8]}$$

Here, $o_k^A$ indicates the k-th seat of the target theatre A, $\hat{\delta}_i^{total}$ indicates the i-th local shape of the total image representation model ($\hat{M}_{total}$), and $w_{i,k}$ indicates the weighted value.

The suitability of the theatre A decreases as the value of $E_A$ increases. FIG. 7(b) shows a value E for all theatres. These values are compared with the total image representation model $\hat{M}_{total}$ to show how the seat distributions of the theatres are different.

After estimating the value E for all theatres, an unsuitable theatre is excluded by using a predetermined reference value $E_{TH}$. That is, it is estimated that the theatre is not suitable when the value E of the estimation target theatre A is equal to or larger than the reference value $E_{TH}$ and it is estimated that the theatre is suitable otherwise. The reference value $E_{TH}$ at this time can be arbitrarily determined and adjusted in consideration of the budget, the screen size, the statistical value E, and the like of the theatre chain.

Figure 8:
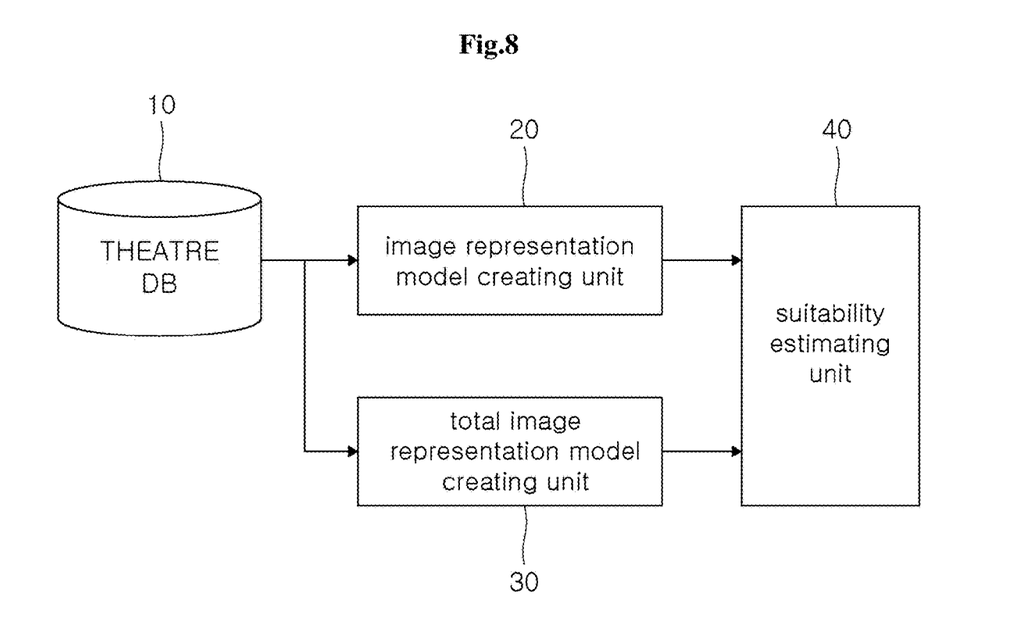
FIG. 8 is a configuration diagram of a device for estimating suitability as a multi-screen projecting type theatre according to an exemplary embodiment of the present disclosure.

FIG. 8 is a configuration diagram of a device for estimating suitability as a multi-screen projecting type theatre according to an exemplary embodiment of the present disclosure.

Referring to FIG. 8, the device of the present disclosure may include a theatre DB (Database) (10) which stores information on screens and seats of a plurality of candidate theatres, an image representation model creating unit (20) which creates a plurality of image representation models (M) respectively corresponding to the plurality of candidate theatres, a total image representation model creating unit (30) which calculates a total image representation model ($\hat{M}_{total}$) corresponding to all of the plurality of candidate theatres, a suitability estimating unit (40) which calculates a deviation between each of the plurality of image representation models (M) and the total image representation model ($\hat{M}_{total}$) and estimates each theatre suitability of the plurality of candidate theatres based on the deviation, and the like.

Such a suitability estimating device may be implemented as a single independent hardware device, but may be implemented while being built-in or installed in another device in the form of an embedded device or a software program if necessary.

While the present disclosure has been described with reference to the embodiments illustrated in the figures, the embodiments are merely examples, and it will be understood by those skilled in the art that various changes in form and other embodiments equivalent thereto can be performed. Therefore, the technical scope of the disclosure is defined by the technical idea of the appended claims The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method for estimating the suitability as the multi-screen projecting type theatre comprising:

creating a plurality of image representation models (M) respectively corresponding to a plurality of candidate theatres;

calculating a total image representation model ($\hat{M}_{total}$) corresponding to all of the plurality of candidate theatres; and calculating a deviation between the total image representation model ($\hat{M}_{total}$) and each of the plurality of image representation models (M) of a target theatre and estimating theatre suitability of the target theatre based on the deviation when one target theatre is selected among the plurality of candidate theatres, wherein the step of calculating the theatre suitability of the target theatre comprises:

resizing an image projected onto a screen of the target theatre, calculating a deviation ($E_A$) between the total image representation model ($\hat{M}_{total}$) and a seat distribution of the target theatre A according to the formula of $$\text{``}E_A = \frac{1}{k} \cdot \sum_k \sum_i w_{i,k} \left( \hat{\delta}_i^{total} - \delta_i(o_k^A) \right)^2 \text{''};$$

and determining that the theatre is not suitable when the deviation ($E_A$) is equal to or larger than a predetermined reference value and determining that the theatre is suitable otherwise, wherein $o_k^A$ indicates a k-th seat of the target theater A, $\hat{\delta}_i^{total}$ indicates an i-th local shape of the total image representation model ($\hat{M}_{total}$), and $w_{i,k}$ indicates a weighted value, wherein the method is performed by a hardware device.

2. A method for estimating the suitability as the multi-screen projecting type theatre comprising:

creating a plurality of image representation models (M) respectively corresponding to a plurality of candidate theatres;

calculating a total image representation model ($\hat{M}_{total}$) corresponding to all of the plurality of candidate theatres;

calculating a deviation between the total image representation model ($\hat{M}_{total}$) and each of the plurality of image representation models (M) of a target theatre and estimating theatre suitability of the target theatre based on the deviation when one target theatre is selected among the plurality of candidate theatres; and resizing an image projected onto a screen of the target theatre, wherein the step of creating the image representation model (M) comprises:

creating a grid mesh corresponding to each seat by vertically and horizontally sampling a screwing viewing angle at each seat of the candidate theatre;

recognizing local shapes of all vertexes in the grid meshes respectively corresponding to the seats and seeking a final local shape for minimizing a sum of a difference between the local shapes;

acquiring a vertex set corresponding to the final local shape and creating a final grid mesh including the vertex set; and setting the final grid mesh by the image representation model (M) of the candidate theatre, wherein the method is performed by a hardware device.

3. The method for estimating the suitability as the multi-screen projecting type theatre of claim 2, wherein in the step of seeking the final local shape, the local shapes of all vertexes in the grid meshes respectively corresponding to the seats are recognized by using Laplacian coordinates or similarity transformation.

4. A unit for estimating suitability as a multi-screen projecting type theatre comprising:

an image representation model creating unit which creates a plurality of image representation models (M) respectively corresponding to a plurality of candidate theatres;

a total image representation model creating unit which calculates a total image representation model ($\hat{M}_{total}$) corresponding to all of the plurality of candidate theatres; and a suitability estimating unit which calculates a deviation between each of the plurality of image representation models (M) and the total image representation model ($\hat{M}_{total}$) and estimates theatre suitability of each of the plurality of candidate theatres based on the deviation, wherein the image representation model creating unit creates a grid mesh corresponding to each seat by vertically and horizontally sampling a screwing viewing angle at each seat of the candidate theatre, resizes an image projected onto a screen of the candidate theatre, recognizes local shapes of all vertexes in the grid meshes respectively corresponding to the seats and seeking a final local shape for minimizing a sum of a difference between the local shapes, acquires a vertex set corresponding to the final local shape and creating a final grid mesh including the vertex set, and sets the final grid mesh by the image representation model (M) of the candidate theatre, wherein the unit is implemented by a hardware device.

* * * * *